United States Patent
Wang et al.

(10) Patent No.: US 12,493,661 B2
(45) Date of Patent: Dec. 9, 2025

(54) SIMILARITY SENSITIVE DIVERSITY

(71) Applicant: eBay Inc., San Jose, CA (US)

(72) Inventors: Yuyan Wang, San Jose, CA (US); Yan Liang, San Jose, CA (US); Aritra Mandal, San Jose, CA (US); Daniel Tunkelang, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/545,741

(22) Filed: Dec. 19, 2023

(65) Prior Publication Data

US 2025/0200120 A1    Jun. 19, 2025

(51) Int. Cl.
*G06F 16/00* (2019.01)
*G06F 16/9532* (2019.01)
*G06F 16/9535* (2019.01)
*G06F 16/954* (2019.01)

(52) U.S. Cl.
CPC ...... *G06F 16/9532* (2019.01); *G06F 16/9535* (2019.01); *G06F 16/954* (2019.01)

(58) Field of Classification Search
CPC . G06F 16/9532; G06F 16/9535; G06F 16/954
USPC ........................................................ 707/723
See application file for complete search history.

(56) References Cited

U.S. PATENT DOCUMENTS

| | | | |
|---|---|---|---|
| 8,819,024 B1 * | 8/2014 | Toderici | G06V 20/41 707/754 |
| 11,188,831 B2 * | 11/2021 | Snyder | G06F 16/54 |
| 11,653,871 B2 | 5/2023 | Yaniv et al. | |
| 11,676,193 B1 * | 6/2023 | VisentiniScarzanella | G06Q 30/0631 705/26.7 |
| 2011/0055192 A1 | 3/2011 | Tang et al. | |
| 2014/0229307 A1 | 8/2014 | Kallumadi et al. | |

(Continued)

FOREIGN PATENT DOCUMENTS

| | | |
|---|---|---|
| CN | 114610960 A | 6/2022 |
| CN | 111242748 B | 4/2023 |

(Continued)

OTHER PUBLICATIONS

Borodin, A., "Determinantal point processes", Available at : <arXiv:0911.1153v1 [math. PR] Nov. 6, 2009>, Nov. 6, 2009, pp. 1-20.

(Continued)

*Primary Examiner* — Bai D Vu
(74) *Attorney, Agent, or Firm* — Shook Hardy & Bacon L.L.P.

(57) ABSTRACT

Similarity sensitive diversity is utilized to measure variation in a distribution of item listings along one or more categories. A cosine similarity between category vectors of each category pair in a set of categories is determined and utilized to generate a pairwise similarity matrix. The pairwise similarity matrix may be pruned to remove category pairs below a threshold. Utilizing the pairwise similarity matrix, similarity sensitive diversity between one or more items of a plurality of items may be determined. In various aspects, the similarity sensitive diversity may be utilized to: generate a list of relevant items in an appropriate distribution, suggest refinements of a search query; generate navigation modules; categorize or recategorize the plurality of items; or generate autosuggestions.

20 Claims, 4 Drawing Sheets

(56) References Cited

U.S. PATENT DOCUMENTS

| | | | | |
|---|---|---|---|---|
| 2015/0317317 | A1* | 11/2015 | Deng | G06F 16/24578 |
| | | | | 707/748 |
| 2018/0150897 | A1* | 5/2018 | Wang | G06F 16/435 |
| 2018/0181569 | A1* | 6/2018 | Jarr | G06Q 30/0603 |
| 2023/0245201 | A1 | 8/2023 | Xu et al. | |

FOREIGN PATENT DOCUMENTS

| | | |
|---|---|---|
| JP | 6390139 B2 | 9/2018 |
| WO | 2022/147746 A1 | 7/2022 |

OTHER PUBLICATIONS

Brovman, Y.M., "Complementary Item Recommendations at eBay Scale", Deep Learning in Engineering, Feb. 13, 2019, pp. 1-4.

Kulesza et al., "Determinantal Point Processes for Machine Learning", Foundations and Trends® in Machine Learning: vol. 5, No. 2-3, Dec. 12, 2012, pp. 123-286.

Kumar et al., "E-Commerce Website Usability Analysis Using the Association Rule Mining and Machine Learning Algorithm", MDPI—Mathematics, vol. 11, No. 1, Dec. 21, 2022, pp. 1-45.

Leinster et al., "Entropy and Diversity: The Axiomatic Approach", Cambridge university press, Available at : <arXiv:2012.02113v3 [q-bio.PE] Oct. 22, 2022>, Oct. 22, 2022. 452 pages.

Leinster et al., "Measuring diversity: the importance of species similarity", Ecology, vol. 93, No. 3, 2012, pp. 477-489.

Liu et al., "Diversity-Promoting Deep Reinforcement Learning for Interactive Recommendation", Available at : <arXiv:1903.07826v1 [cs.IR] Mar. 19, 2019>, Mar. 19, 2019., 8 pages.

Mehta et al.., "Collaborative Personalized Web Recommender System using Entropy based Similarity Measure", International Journal of Computer Science Issues, vol. 8, No. 3, Nov. 2011. 10 pages.

Mistry, S., "Cosine Similarity between products to recommend similar products", Analytics Vidhya, Jul. 7, 2020. pp. 1-13.

Extended European Search Report received from European Patent Application No. 24219599.8, mailed on Apr. 15, 2025, 9 pages.

* cited by examiner

SIMILARITY SENSITIVE DIVERSITY

BACKGROUND

Many product search systems allow users to submit search queries consisting of a few words or terms. The search systems return a list of relevant items related to the search queries based on keyword search that are available within a corresponding site. If some of the relevant items have similar attributes but correspond to distinct categories, the search systems may not return results in an appropriate distribution.

SUMMARY

At a high level, aspects described herein relate to search engines. More particularly, aspects described herein relate to a search engine that leverages similarity sensitive diversity to measure variation in a distribution of item listings along one or more categories. A cosine similarity between category vectors of each category pair in a set of categories is determined and utilized to generate a pairwise similarity matrix. The pairwise similarity matrix may be pruned to remove category pairs below a threshold. Utilizing the pairwise similarity matrix, similarity sensitive diversity between one or more items of a plurality of items may be determined. In various aspects, the similarity sensitive diversity may be utilized to: generate a list of relevant items in an appropriate distribution, suggest refinements of a search query; generate navigation modules; categorize or recategorize the plurality of items; or generate autosuggestions.

The Summary is intended to introduce a selection of concepts in a simplified form that is further described in the Detailed Description of this disclosure. The Summary is not intended to identify key or essential features of the claimed subject matter, nor is it intended to be used as an aid in determining the scope of the claimed subject matter. Additional objects, advantages, and novel features of the technology will be provided, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

While search engines are an incredibly useful tool for providing search results for received search queries, shortcomings in existing search technologies often result in the consumption of an unnecessary quantity of computing resources (e.g., I/O costs, network packet generation costs, throughput, memory consumption, etc.). When performing searches, users are often seeking particular search results but may enter somewhat ambiguous search queries. Even if the search query isn't ambiguous, items responsive to the search query may not be appropriately categorized (items may be categorized among multiple, but similar, categories). For instance, in the context of a search for PELOTON, a user may be seeking a women's PELOTON branded shirt. However, the results that are provided to the user may include categories for exercise bikes, women's active wear pants, sports bras, women's active wear tops, women's tops, men's active wear tops, among other categories. Many of these categories are so similar the search results would be more useful to the user if they were combined (e.g., women's active wear pants, sports bras, women's active wear tops, women's tops) and surfaced according to categories that acknowledged the similarity among items so the user could find the women's PELOTON branded shirt in a single search. In this context, existing search technologies are unable to provide search results that are helpful or with appropriate diversity, which then requires the user to submit additional search queries or multiple filters to obtain the desired search results.

This requires the user to perform multiple searches to identify products available for purchase among multiple categories. This process unnecessarily consumes various computing resources of the search system, such as processing power, network bandwidth, throughput, memory consumption, etc. In some instances, the multiple attempts to identify products may even completely fail to satisfy the user's goal, thus requiring the user to spend even more time and computing resources on the search process by repeating the process of issuing additional queries until the user finally accesses the desired content items. In some cases, the user may even give up searching because the search engine was not able to return desired search results after multiple searches.

These shortcomings of existing search technologies adversely affect computer network communications. For example, each time a query is received, contents or payload of the search queries is typically supplemented with header information or other metadata, which is multiplied by all the additional queries needed to obtain the particular item(s) the user desires. As such, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if multiple users repetitively issue queries, it is expensive because processing queries consumes a lot of computing resources. For example, for some search engines, a query execution plan may need to be calculated each time a query is issued, which requires a search system to find the least expensive query execution plan to fully execute the query. This decreases throughput and increases network latency, and can waste valuable time.

Aspects of the technology described herein improve the functioning of the computer itself in light of these shortcomings in existing search technologies by providing a solution that enables a search engine to leverage similarity sensitive diversity to measure variation in a distribution of item listings along one or more categories. In various aspects, the similarity sensitive diversity may be utilized to: generate a list of relevant items in an appropriate distribution, suggest refinements of a search query; generate navigation modules; categorize or recategorize the plurality of items; or generate autosuggestions. As can be appreciated, better results are achieved compared to traditional search engines that require multiple search queries from the user.

Aspects of the technology described herein provide a number of improvements over existing search technologies. For instance, computing resource consumption is improved relative to existing technologies. In particular, the search accuracy is enhanced by leveraging similarity sensitive diversity to measure variation in a distribution of item listings along one or more categories, thereby allowing the user to more quickly access relevant search results. This eliminates (or at least reduces) the repetitive user queries and filter selections because the search results are appropriately distributed and categorized. Accordingly, aspects of the technology described herein decrease computing resource consumption, such as processing power and network bandwidth. For instance, a user query (e.g., an HTTP request), would only need to traverse a computer network once (or fewer times relative to existing technologies).

In like manner, aspects of the technology described herein improve storage device or disk I/O and query execution functionality. As described above, the inadequate search results provided by existing search technologies results in repetitive user queries and filter selections. This causes multiple traversals to disk I/O. In contrast, aspects described herein reduce storage device I/O because the user provides a reduced amount of inputs so the computing system does not have to reach out to the storage device as often to perform a read or write operation. For example, by leveraging similarity sensitive diversity, the search engine can respond with enhanced search results enabling a user to identify purchase appropriately distributed and categorized items with a single search query. Accordingly, there is not as much wear due to query execution functionality.

Having briefly described an overview of aspects of the technology described herein, an exemplary operating environment in which aspects of the technology described herein may be implemented is described below.

Figure 1:
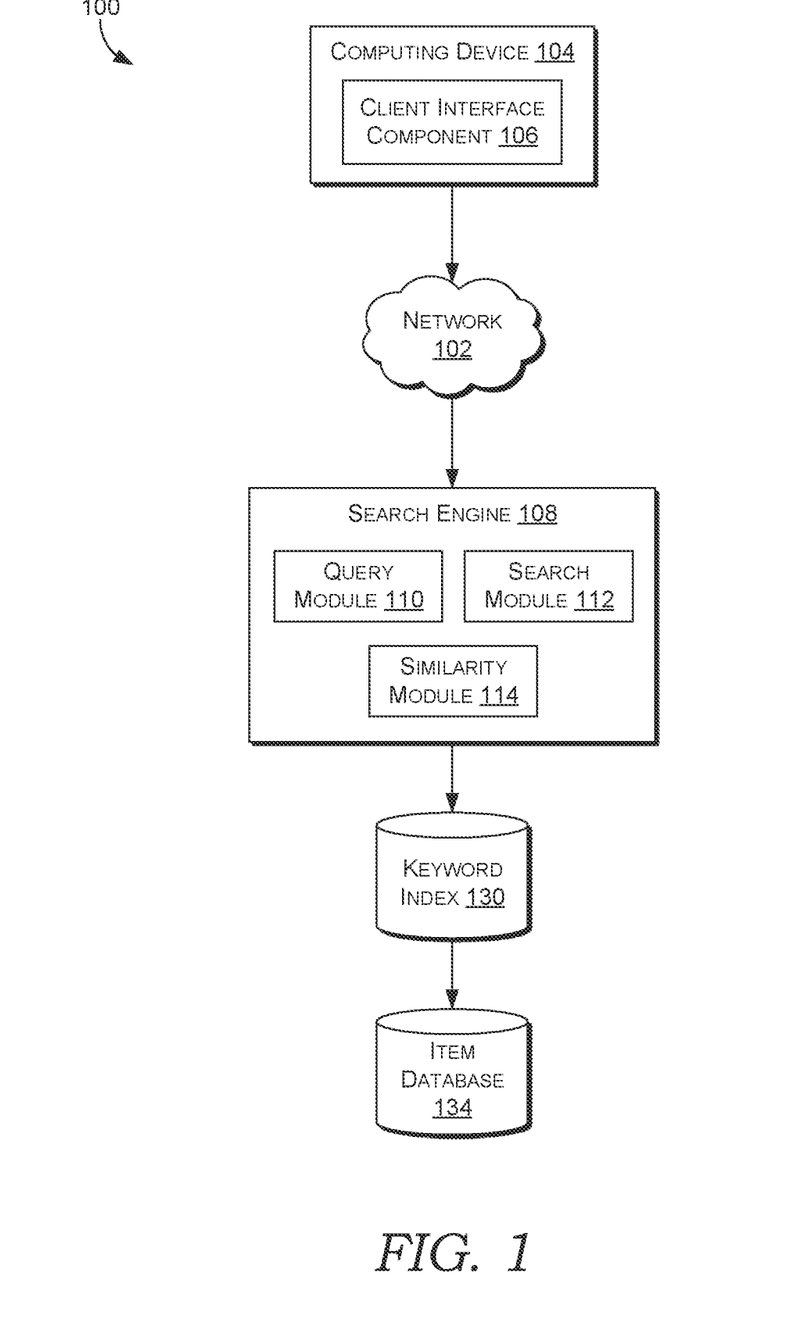
FIG. 1 is a block diagram of an example operating environment suitable for implementing aspects of the technology.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a network 102; a computing device 104 having a client interface component 106; search engine 108 having a query module 110, a search module 112, and a similarity module 114; keyword index 130; and item database 134. It should be understood that environment 100 shown in FIG. 1 is an example of one suitable operating environment. Each of the components shown in FIG. 1 may be implemented via any type of computing device, such as computing device 400, described below in connection to FIG. 4, for example.

These components may communicate with each other via the network 102, which may include, without limitation, one or more local area networks (LANs) and/or wide area networks (WANs). In exemplary implementations, the network 102 comprises the Internet and/or a cellular network, amongst any of a variety of possible public and/or private networks. In aspects, the network 102 may include multiple networks, as well as being a network of networks, but is shown in more simple form so as to not obscure other aspects of the present disclosure.

It should be understood that any number of user devices, servers, and data sources may be employed within the operating environment 100 within the scope of the present disclosure. Each may comprise a single device or multiple devices cooperating in a distributed environment. For instance, the search engine 108 may be provided via multiple devices arranged in a distributed environment that collectively provide the functionality described herein. Additionally, other components not shown may also be included within the distributed environment.

The computing device 104 can be a client device on the client-side of the operating environment 100, while the search engine 108 can be on the server-side of operating environment 100. For example, the search engine 108 can comprise server-side software designed to work in conjunction with client-side software on the computing device 104 so as to implement any combination of the features and functionalities discussed in the present disclosure. This division of the operating environment 100 is provided to illustrate one example of a suitable environment, and there is no requirement for each implementation that any combination of the search engine 108 and the computing device 104 remain as separate entities. While the operating environment 100 illustrates a configuration in a networked environment with a separate computing device, search engine, keyword index, and item database, it should be understood that other configurations can be employed in which components are combined. For instance, in some configurations, a computing device may also serve as a data source and/or may provide search capabilities.

The computing device 104 may comprise any type of computing device capable of use by a user. For example, in one aspect, the computing device 104 may be the type of computing device 400 described in relation to FIG. 4 herein. By way of example and not limitation, a computing device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where search queries may be performed via the client interface component 106 or where notifications can be presented via the client interface component 106. A user may be associated with the computing device 104. The user may communicate with the search engine 108 through one or more computing devices, such as the computing device 104.

At a high level, the search engine 108 receives a text-based search query (e.g., a natural language query or structured query) or an audio query comprising voice or other audio input from the computing device 104 (or another computing device not depicted). In aspects, the text-based query or the audio query comprises one or more keywords. The search query may comprise any type of input from a user for initiating a search comprising one or more keywords. In response to receiving the search query, the search engine 108 generates and ranks text-based results in a single set of search results.

In some configurations, the search engine 108 may be embodied on one or more servers. In other configurations, the search engine 108 may be implemented at least partially or entirely on a user device, such as computing device 400 described in FIG. 4. The search engine 108 (and its components) may be embodied as a set of compiled computer instructions or functions, program modules, computer software services, or an arrangement of processes carried out on one or more computer systems.

As shown in FIG. 1, the search engine 108 includes the query module 110, the search module 112, and the similarity module 114. In one aspect, the functions performed by modules of the search engine 108 are associated with one or more applications, services, or routines. In particular, such applications, services, or routines may operate on one or more user devices (such as computing device 104) or servers (e.g., the search engine 108), or may be distributed across one or more user devices and servers. In some aspects, the applications, services, or routines may be implemented in the cloud. Moreover, in some aspects, these modules of the search engine 108 may be distributed across a network, including one or more servers and client devices (such as computing device 104), in the cloud, or may reside on a user device such as computing device 104.

In addition, the modules of the search engine 108 and the functions and services performed by these modules may be implemented at appropriate abstraction layer(s) such as an operating system layer, an application layer, or a hardware layer, etc. Alternatively, or in addition, the functionality of these modules (or the aspects of the technology described herein) can be performed, at least in part, by one or more hardware logic components. For instance, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Further, although functionality is described herein with regards to specific modules shown in search engine 108, it is contemplated that in some aspects, functionality of one of the modules can be shared or distributed across other modules.

The query module 110 receives a search query comprising one or more text-based keywords. For example, a user may input a search query at computing device 104 via a client interface component 106 that provides access to a search engine. As previously mentioned, the search query may comprise any type of input from a user for initiating a search comprising one or more keywords.

The query module 110 may be configured to receive the search. Additionally, the query module 110 may be configured to communicate the search query to other modules of search engine 108, such as the search module 112 or similarity module 114, for example. Further, the user query module 110 may be configured to suggest and provide refinements of a search query, generate and provide navigation modules, categorize or categorize the plurality of items, generate and provide autosuggestions, or provide search results to computing devices, such as computing device 104.

The query module 110 may cause one or more graphical user interface displays of various computing devices to display the search query, suggested refinements to the search query, navigation modules, categories of items responsive to the search query, autosuggestions, or items responsive to the search query. In aspects, query module 110 causes the client interface component 106, through which the search query is input (e.g., by a user in a search tool on a web page), to display the search query, suggested refinements, navigation modules, categories of items responsive to the search query, autosuggestions, or items responsive to the search query. Further, the query module 110 may comprise an Application Program Interface (API) that allows applications to submit the search query (and optionally other information, such as user information, contextual information, and the like) for receipt by the search engine 108.

The search module 112 identifies search results in response to search queries processed against item database 134, which is described in more detail below. For example, the search module 112 may query the keyword index 130 to identify results that satisfy criteria of the search query. In some aspects, the results identified in the keyword index 130 are mapped to items in the item database 134. For clarity, an item may be an item listing for a product and may include a variety of additional information, such as price, price range, quality, condition, ranking, material, brand, manufacturer, etc.

The search module 112 also ranks the search results. In some aspects, information learned from historical search sessions or user feedback is utilized to optimize the ranking of the search results. For example, selections made by other users submitting similar queries may be leveraged to increase or decrease the ranking of individual items within the search results.

In some aspects, feedback may be stored in search logs. The search logs may be embodied on a plurality of databases, wherein one or more of the databases comprise one or more hardware components that are part of the search engine 108. In aspects, the search log are configured for storing information regarding historical search sessions for users, including, for instance, search queries submitted by a plurality of users via client interface components (e.g., client interface component 106), search results associated with the historical search queries, item listings for the search results, or user interactions (e.g., hovers, click-throughs, purchases, etc.) associated with the search results. In some embodiments, the search logs store a timestamp (e.g., day, hour, minute, second, etc.) for each user query, search result, item listing associated with the search result, user interaction with the search result, and so forth.

In addition, the information stored in search logs regarding historical search sessions may include other result selection information, such as subsequent filters selected in response to receiving search results and item listings. In some embodiments, result selection information may include the time between two successive selections of search results, the language employed by the user, and the country where the user is likely located (e.g., based on a server used to access the search engine 108). In some implementations, other information associated with the historical search sessions that is stored may comprise user interactions with a ranking displayed within an item listing, negative feedback displayed with the item listing, and other information such as whether the user clicked or viewed a document associated with an item listing. User information including user cookies, cookie age, IP (Internet Protocol) address, user agent of the browser, and so forth, may also be stored in search logs. In some embodiments, the user information is recorded in the search logs for an entire user session or multiple user sessions.

The keyword index 130 and item database 134 may comprise data sources or data systems, which are configured to make data available to any of the various constituents of operating environment 100. The keyword index 130 and item database 134 may be discrete components separate from search engine 108 or may be incorporated or integrated into the search engine 108 or other components the operating environment 100. Among other things, item database 134 can store search results associated with search queries about which information can be indexed in keyword index 130.

The keyword index 130 can take the form of an inverted index, but other forms are possible. The keyword index 130 stores the information about items in a manner that allows the search engine 108 to efficiently identify search results for a search query. The search engine 108 can be configured to run any number of queries on the keyword index 130. The keyword index 130, according to an example embodiment, may include an inverted index storing a mapping from textual search queries to items in item database 134.

The similarity module 114 leverages similarity sensitive diversity to measure variation in a distribution of objects along one or more categories. In the search context, objects are items (e.g., items for sale) and dimensions are categories or aspect values. In aspects, the distribution may be based on demand (i.e., buyers), supply (i.e., sellers), or a combination of the two. For example, a seller may list an item for sale and describe particular aspects of the item. Moreover, the seller may assign a particular category to the item. Another seller may list the same item for sale and describe different aspects of the item or assign a different category to the item. Similarly, a buyer may search for a particular item for sale and enter particular aspects of the item in the search query or search in a particular category for the item. Another buyer may search for the same item for sale and enter different aspects of the item or search in a different category for the item. Although described with respect to categories, it is contemplated other aspects (e.g., price, color, etc.) could be similarly used as described below.

Using the similarity sensitive diversity, similarity module 114 is able to reconcile these slight differences in aspects or categories to surface the appropriate distribution of items along the one or more categories. For example, consider an item that is provided in multiple colors (e.g., red, blue, yellow, green) and there are four items of each color available for sale in an electronic marketplace. Next, consider an item that is provided in multiple shades of a single color (e.g., lightest blue, light blue, blue, and dark blue) and there are four items of each shade available for sale in an electronic marketplace. Finally, consider an item that is provided in one shade of a single color (e.g., light blue) and there are sixteen of these items available for sale in an electronic marketplace.

Using a conventional measure of diversity, such as Shannon Entropy (for context, Shannon diversity treats values of a probability distribution as either the same or completely distinct), the first two examples (e.g., an item that is provided in multiple colors and an item that is provided in multiple shades of a single color) would each have a diversity of approximately four. However, this neglects the similarity of the item that is provided in multiple shades of single color, whose diversity is likely more appropriately represented as close to one and more similar to example three (e.g., an item that is provided in one shade of a single color). For clarity, although the term Shannon Entropy is used herein to describe a conventional measure of diversity, it is actually the exponentiation of Shannon Entropy that is conventionally utilized to measure diversity (i.e., 2 to the power of Shannon Entropy).

Now consider a collection of 100 shirts that come in four different colors. If the shirts are uniformly distributed across the colors, the Shannon diversity is four. But, if two of the four colors are very close to each other, the search results will not be properly distributed. There will be a 25% split across the four colors, even though two are nearly the same. However, using similarity sensitive diversity, the diversity may be slightly less than three and there will be a 50%/25%/25% split over three colors which represents a more accurate distribution among the search results.

Referring back to the PELOTON example, actual experiments using Shannon Entropy to determine diversity yielded 14.6 categories. For example, the results provided to the user included categories for exercise bikes, women's active wear pants, sports bras, women's active wear tops, women's tops, men's active wear tops, among other categories. These results are not useful to the user because the user has to search multiple categories or apply multiple filters to identify the item the user is actually searching for. However, using similarity sensitive diversity, in actual experiments, similarity module 114 determined diversity to be 3.11. So if the user is searching for a women's PELOTON branded shirt, and the results are surfaced according to categories (e.g., exercise bikes, women's clothes, men's clothes) that more appropriately acknowledge the actual diversity among items, the user is more likely to find the item in a single search.

In various aspects, the similarity sensitive diversity can be utilized to suggest refinements of a search query, generate navigation modules, categorize or recategorize the plurality of items, or generate autosuggestions. For example, if the user submits a search query for PELOTON but is really looking for a women's PELOTON branded shirt, once the similarity sensitive diversity is determined by the similarity module 114, the query module 110 might provide suggested refinements of the search query such as PELOTON bikes, women's PELOTON apparel, or men's PELOTON apparel. In a similar manner, as the user is typing the search query, the query module 110 might generate autosuggestions such as PELOTON bikes, women's PELOTON apparel, or men's PELOTON apparel.

In some aspects, the query module 110 alters the display of the user interface to utilize navigation modules that, when selected, reveal items corresponding to, for example, PELOTON bikes, women's PELOTON apparel, or men's PELOTON apparel. For example, rather than listing all the items responsive to the query, PELOTON, the query module may provide the navigation modules so the user only sees the items within the category of PELOTON items the user is actually searching for. In this way, the similarity sensitive diversity influenced navigation modules can be used to conserve valuable space in the user interface.

In another example, the similarity module 114 may determine the similarity sensitive diversity and suggest a category or aspect to a seller when listing an item for sale. Or, if an item is already listed for sale but may include an ambiguous category or aspect, the similarity sensitive diversity can be utilized to recategorize the item or revise the aspect. Continuing the PELOTON example, consider a seller listed the women's PELOTON branded shirt under a women's tops category. In a search system that utilizes Shannon Diversity or doesn't use any form of diversity measure to categorize items, it may take the user multiple searches and/or filters to find the women's PELOTON branded shirt. However, by leveraging similarity sensitive diversity, the query module 110 may suggest categories to the user when listing the item or recategorize the item after the seller has listed the item.

Figure 2:
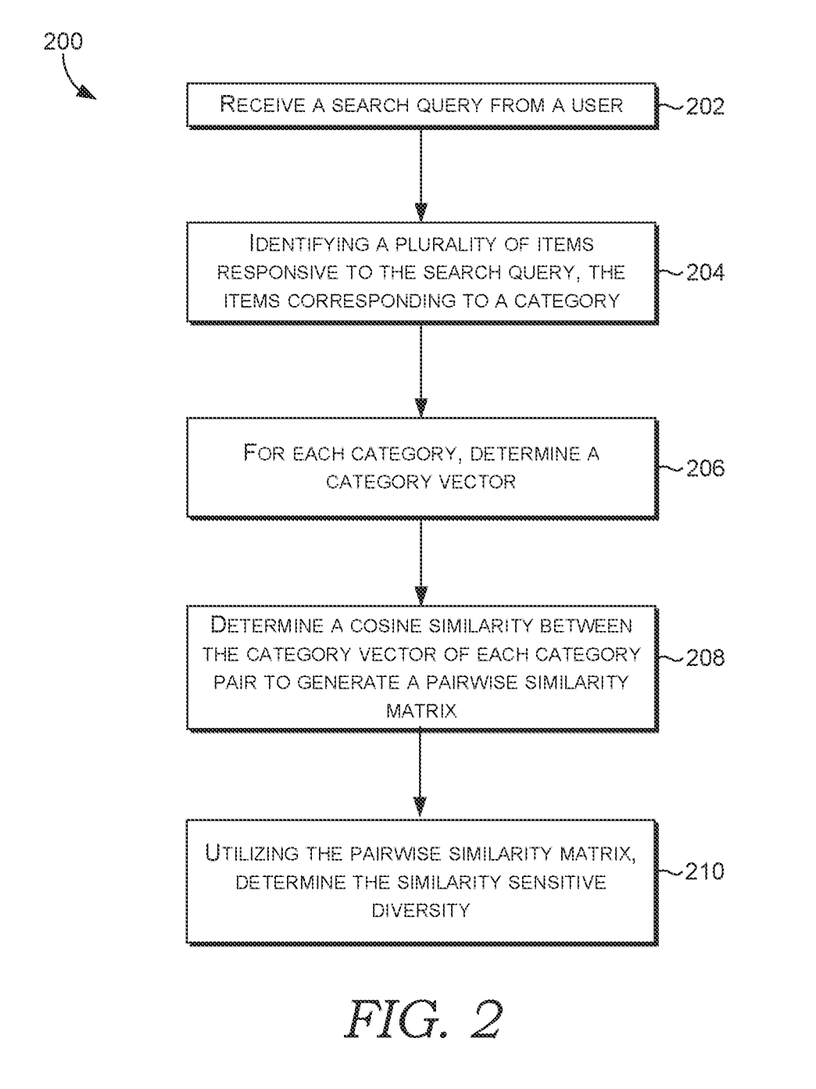
FIG. 2 is a flow diagram showing an example method, in accordance with an aspect of the technology described herein.

FIG. 2 is a flow diagram showing a method 200 for determining similarity sensitive diversity, in accordance with an aspect of the technology described herein. The method 200 may be performed, for instance, by the search engine 108 of FIG. 1. As shown at block 202, a search query is received from a user. For example, the search query may be received at a search engine (search engine 108 of FIG. 1) from computing device (such as computing device 104 of FIG. 1) via a client interface component (such as client interface component 106 of FIG. 1

At block 204, a plurality of items responsive to the search query are identified. Each item of the plurality of items corresponds to a category. The category may be defined by a seller of each item of the plurality of items. For example, the seller may list various PELOTON items under categories including exercise bikes, women's active wear pants, sports bras, women's active wear tops, women's tops, men's active wear tops, among other categories.

At block 206, for each category, a category vector is determined. The category vector may be determined by aggregating item vectors of clicked or purchased items of the plurality of items. In some aspects, the category vector may be determined using attributes or categories defined by the seller.

At block 208, a cosine similarity between the category vector of each category pair is determined to generate a pairwise similarity matrix. Although a cosine similarity between the category vector of each category pair is described herein and utilized to generate the pairwise similarity matrix, it is contemplated and within the scope of this disclosure that any vector similarity function could be similarly utilized (e.g., Euclidean distance). In some aspects, the pairwise similarity matrix is pruned to remove category pairs below a threshold (e.g., category pairs below, for example, 0.88, are removed and treated as 0). At block 210, utilizing the pairwise similarity matrix, the similarity sensitive diversity is determined.

In some aspects, the similarity sensitive diversity may be utilized to suggest refinements of the search query. In other aspects, the similarity sensitive diversity may be utilized to generate navigation modules. In other aspects, the similarity sensitive diversity may be utilized to categorize or recategorize the plurality of items. In other aspects, the similarity sensitive diversity may be utilized to generate autosuggestions.

Figure 3:
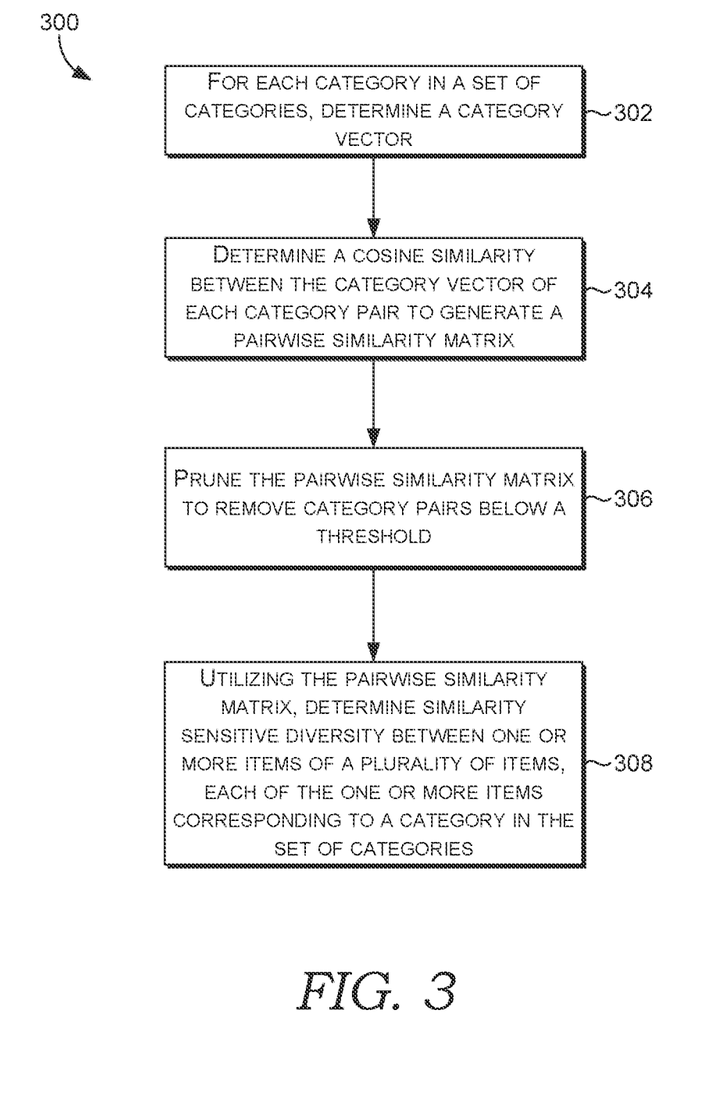
FIG. 3 is a flow diagram showing an example method, in accordance with an aspect of the technology described herein.

FIG. 3 is a flow diagram showing a method 300 for determining similarity sensitive diversity, in accordance with an aspect of the technology described herein. The method 300 may be performed, for instance, by the search engine 108 of FIG. 1. As shown at block 302, for each category in a set of categories, a category vector is determined.

At block 304, a cosine similarity between the category vector of each category pair is determined to generate a pairwise similarity matrix. At block 306, the pairwise similarity matrix is pruned to remove category pairs below a threshold. At block 308, the pairwise similarity matrix is utilized to determine similarity sensitive diversity between one or more items of a plurality of items. Each of the one or more items corresponds to a category in the set of categories. For example, the pairwise similarity matrix Z is utilized as an input describing similarity between every pair of values. If Z is the identity matrix, then every pair of distinct values is treated as completely unrelated. Off-diagonal non-zero values indicate similarities that similarity sensitive diversity accounts for. Z can be used to adjust the definition of information content to make it similarity sensitive: $\log_2(1/Z(\Sigma_{ij} * p_j))$. Then, similarity sensitive diversity can be determined by:

$$D_q^Z(p) = \left( \sum\nolimits_{i \in supp(p)} p_i (Zp)_i^{q-1} \right)^{1/(1-q)}.$$

Figure 4:
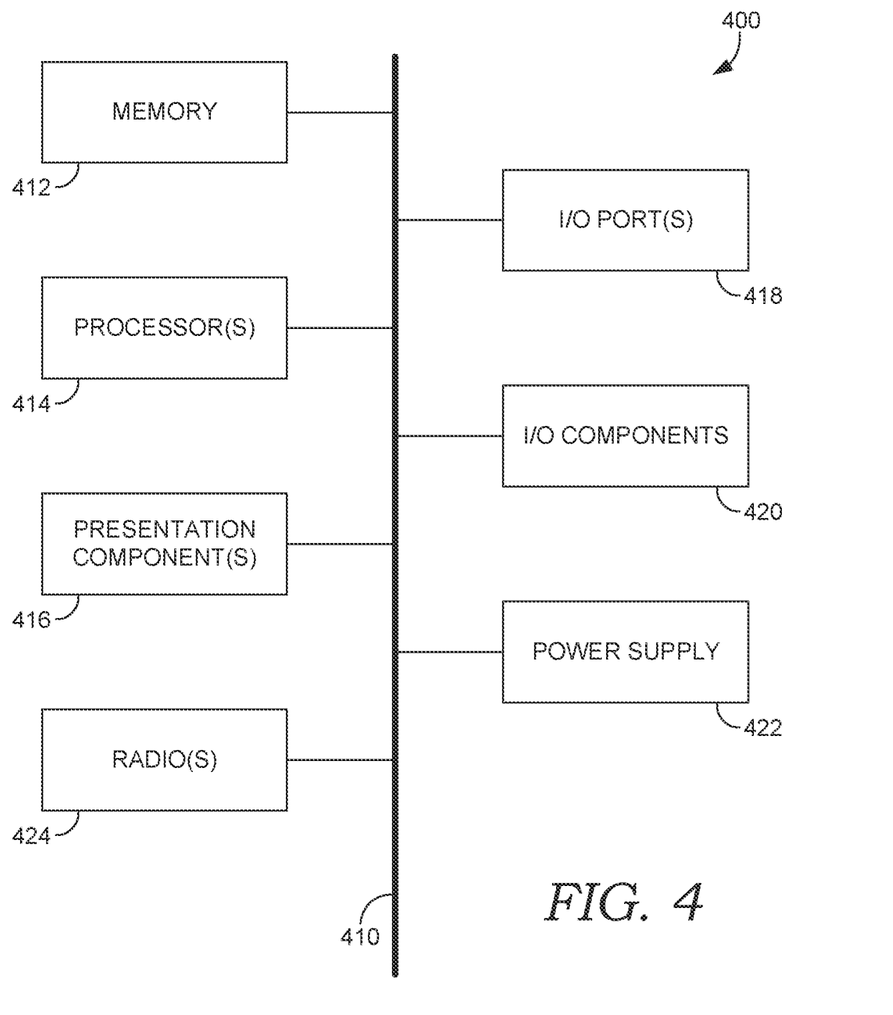
FIG. 4 is an example computing device suitable for implementing the described technology, in accordance with an aspect described herein.

With reference to FIG. 4, computing device 400 includes a bus 410 that directly or indirectly couples the following devices: memory 412, one or more processors 414, one or more presentation components 416, one or more input/output (I/O) ports 418, one or more I/O components 420, and an illustrative power supply 422. Bus 410 represents what may be one or more busses (such as an address bus, data bus, or combination thereof). Although the various blocks of FIG. 4 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 4 is merely illustrative of an exemplary computing device that can be used in connection with one or more aspects of the present technology. Distinction is not made between such categories as "workstation," "server," "laptop," "handheld device," etc., as all are contemplated within the scope of FIG. 4 and with reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 400. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors 414 that read data from various entities such as memory 412 or I/O components 420. Presentation component(s) 416 presents data indications to a user or other device. Exemplary presentation components include a display device, speaker, printing component, vibrating component, and the like.

The I/O ports 418 allow computing device 400 to be logically coupled to other devices, including I/O components 420, some of which may be built in. Illustrative components include a microphone, joystick, game pad, satellite dish, scanner, printer, wireless device, etc.

The I/O components 420 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as stereoscopic camera systems, infrared camera systems, RGB camera systems, and combinations of these, for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

Some aspects of computing device 400 may include one or more radio(s) 424 (or similar wireless communication components). The radio 424 transmits and receives radio or wireless communications. The computing device 400 may be a wireless terminal adapted to receive communications and media over various wireless networks. Computing device 400 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

What is claimed is:

1. A method comprising:
receiving, by at least one of one or more servers of a search engine, a search query from a user device;
responsive to the search query, querying, by at least one of the one or more servers of the search engine, an item database using the search query to identify a set of search results comprising a plurality of items responsive to the search query, the plurality of items corresponding to a plurality of categories;
generating, by at least one of the one or more servers of the search engine, a pairwise similarity matrix for the plurality of categories of the plurality of items, the pairwise similarity matrix storing a plurality of similarity scores for a plurality of category pairs from the plurality of categories, wherein the similarity score for each category pair from the plurality of category pairs comprises a similarity between category vectors of the categories in each category pair, and wherein the category vectors of the categories are generated from item vectors of items having user interactions for the categories from a plurality of users of the search engine;
utilizing at least a portion of the plurality of similarity scores from the pairwise similarity matrix, determining, by at least one of the one or more servers of the search engine, a similarity sensitive diversity that provides a measure of categorical distribution of the plurality of items responsive to the search query in the set of search results;
generating, by at least one of the one or more servers of the search engine, modified search results based on the similarity sensitive diversity and the set of search results; and
providing, by at least one of the one or more servers of the search engine, the modified search results for presentation on the user device.

2. The method of claim 1, further comprising generating the pairwise similarity matrix by:
generating the category vector for each category from the plurality of categories based on historical search data;
determining the similarity score for each category pair; and pruning the pairwise similarity matrix to remove one or more category pairs having a corresponding similarity score below a threshold.

3. The method of claim 1, wherein the category vector for each category from the plurality of categories is determined by aggregating item vectors of clicked or purchased items.

4. The method of claim 1, further comprising utilizing the similarity sensitive diversity to suggest refinements of the search query.

5. The method of claim 1, further comprising utilizing the similarity sensitive diversity to generate navigation modules.

6. The method of claim 1, further comprising further comprising utilizing the similarity sensitive diversity to categorize the plurality of items.

7. The method of claim 1, further comprising utilizing the similarity sensitive diversity to generate autosuggestions.

8. One or more non-transitory computer storage media storing computer-readable instructions that when executed by a processor, cause the processor to perform operations, the operations comprising:
for each category in a set of categories, determining a category vector from item vectors of items having user interactions for each category from a plurality of users of a search engine;
determining a cosine similarity between the category vectors of each category pair from the set of categories to generate a pairwise similarity matrix comprising a plurality of similarity scores for a plurality of category pairs from the set of categories;
responsive to a search query from a user device, querying, by at least one of one or more servers of the search engine, an item database using the search query to identify a set of search results comprising a plurality of items responsive to the search query, the plurality of items corresponding to a plurality of categories from the set of categories;
utilizing at least a portion of the plurality of similarity scores from the pairwise similarity matrix, determining, by at least one of the one or more servers of the search engine, a similarity sensitive diversity that provides a measure of categorical distribution of the plurality of items responsive to the search query in the set of search results;
generating, by at least one of the one or more servers of the search engine, modified search results based on the similarity sensitive diversity and the set of search results; and
providing, by at least one of the one or more servers of the search engine, the modified search results for presentation on the user device.

9. The media of claim 8, further comprising, pruning the pairwise similarity matrix to remove one or more category pairs having a corresponding similarity score below a threshold.

10. The media of claim 8, wherein the category vector for each category from the set of categories is determined by aggregating item vectors of clicked or purchased items.

11. The media of claim 8, further comprising utilizing the similarity sensitive diversity to suggest refinements of the search query.

12. The media of claim 8, further comprising utilizing the similarity sensitive diversity to generate navigation modules.

13. The media of claim 8, further comprising further comprising utilizing the similarity sensitive diversity to recategorize the plurality of items.

14. The media of claim 8, further comprising utilizing the similarity sensitive diversity to generate autosuggestions.

15. A system for determining similarity sensitive diversity, the system comprising:
at least one processor; and
one or more computer storage media storing computer-readable instructions that when executed by the at least one processor, cause the at least one processor to perform operations comprising:
receiving, by at least one of one or more servers of a search engine, a search query from a user device;
responsive to the search query, querying, by at least one of the one or more servers of the search engine, an item database using the search query to identify a set of search results comprising a plurality of items responsive to the search query, the plurality of items corresponding to a plurality of categories;
generating, by at least one of the one or more servers of the search engine, a pairwise similarity matrix for the plurality of categories of the plurality of items, the pairwise similarity matrix storing a plurality of similarity scores for a plurality of category pairs from the plurality of categories, wherein the similarity score for each category pair from the plurality of category pairs comprises a similarity between category vectors of the categories in each category pair, and wherein the category vectors of the categories are generated from item vectors of items having user interactions for the categories from a plurality of users of the search engine;
utilizing at least a portion of the plurality of similarity scores from the pairwise similarity matrix, determining, by at least one of the one or more servers of the search engine, a similarity sensitive diversity that provides a measure of categorical distribution of the plurality of items responsive to the search query in the set of search results;
generating, by at least one of the one or more servers of the search engine, modified search results based on the similarity sensitive diversity and the set of search results; and
providing, by at least one of the one or more servers of the search engine, the modified search results for presentation on the user device.

16. The system of claim 15, further comprising generating the pairwise similarity matrix by:
generating the category vector for each category from the plurality of categories based on historical search data;
determining the similarity score for each category pair; and
pruning the pairwise similarity matrix to remove one or more category pairs having a corresponding similarity score below a threshold.

17. The system of claim 15, further comprising utilizing the similarity sensitive diversity to suggest refinements of the search query.

18. The system of claim 15, further comprising utilizing the similarity sensitive diversity to generate navigation modules.

19. The system of claim 15, further comprising further comprising utilizing the similarity sensitive diversity to categorize the plurality of items.

20. The system of claim 15, further comprising utilizing the similarity sensitive diversity to generate autosuggestions.

* * * * *